(12) United States Patent
Katz et al.

(10) Patent No.: US 9,325,195 B2
(45) Date of Patent: Apr. 26, 2016

(54) INDUCTIVELY CHARGEABLE POWER PACK

(75) Inventors: Arkady Katz, Beer Sheva (IL); Amir Ben-Shalom, Modiin (IL); Arik Rofe, Bet Hakerem (IL)

(73) Assignee: POWERMAT TECHNOLOGIES LTD., Neve Ilan (IL)

( * ) Notice: Subject to any disclaimer, the term of this patent is extended or adjusted under 35 U.S.C. 154(b) by 626 days.

(21) Appl. No.: 13/398,413

(22) Filed: Feb. 16, 2012

(65) Prior Publication Data

US 2013/0043833 A1    Feb. 21, 2013

Related U.S. Application Data (63) Continuation of application No. PCT/IL2010/000640, filed on Aug. 8, 2010.

(60) Provisional application No. 61/235,022, filed on Aug. 19, 2009, provisional application No. 61/292,511, filed on Jan. 6, 2010.

(51) Int. Cl.
| | |
|---|---|
| *H02J 7/00* | (2006.01) |
| *H02J 7/02* | (2006.01) |
| *H01M 10/46* | (2006.01) |
| *H01M 10/48* | (2006.01) |

(52) U.S. Cl.
CPC .............. *H02J 7/025* (2013.01); *H01M 10/46* (2013.01); *H01M 10/486* (2013.01)

(58) Field of Classification Search
USPC .......................................... 320/108, 112, 138
See application file for complete search history.

(56) References Cited

U.S. PATENT DOCUMENTS

| | | | | |
|---|---|---|---|---|
| 7,932,694 | B2 * | 4/2011 | Watanabe | H02J 7/0006 320/113 |
| 8,436,576 | B2 * | 5/2013 | Toya | H01M 2/1022 320/108 |
| 2005/0189910 | A1 | 9/2005 | Hui | |
| 2007/0103110 | A1 | 5/2007 | Sagoo | |
| 2009/0261778 | A1 * | 10/2009 | Kook | 320/108 |

FOREIGN PATENT DOCUMENTS

| | | |
|---|---|---|
| JP | 04-156242 | 5/1992 |
| JP | 07-036556 | 2/1995 |
| JP | 07-039078 | 2/1995 |
| JP | 2001-309579 | 11/2001 |
| JP | 2005-006440 | 1/2005 |

(Continued)

OTHER PUBLICATIONS

Office Action dated Mar. 22, 2013, for Mexican Application MX/a/2011/003088.
Office Action dated Feb. 5, 2013, for Chinese Application 201110068458.7.

(Continued)

*Primary Examiner* — Richard V Muralidar
(74) *Attorney, Agent, or Firm* — William Dippert; Laurence Greenberg; Werner Stemer (57) ABSTRACT

An inductively enabled power pack charging system and method includes an integrated circuit for controlling inductive transfer of power to the power pack and managing communication with an external power source. The system may further include an electrochemical cell for storing energy received from the external power supply and magnetic shielding material for guiding magnetic flux away from the electrochemical cell.

20 Claims, 7 Drawing Sheets

(56) References Cited

FOREIGN PATENT DOCUMENTS

| | | | |
|---|---|---|---|
| JP | 2005-110412 | | 4/2005 |
| JP | 2006-102055 | | 4/2006 |
| JP | 2007-529110 | | 10/2007 |
| WO | 2005041281 | A1 | 5/2005 |
| WO | WO2008/050917 | * | 5/2008 |

OTHER PUBLICATIONS

Office Action dated May 28, 2013, for Japanese Application 2010-526422.

Office Action dated May 28, 2013, for Japanese Application 2010-528526.

Office Action dated May 21, 2013, for Japanese Application 2011-500345.

* cited by examiner

INDUCTIVELY CHARGEABLE POWER PACK

CROSS-REFERENCE TO RELATED APPLICATIONS

This application is a continuation of PCT/IL2010/000640 filed Aug. 8, 2010, which claims priority to U.S. Provisional Applications 61/235,022 filed Aug. 19, 2009 and 61/292,511 filed Jan. 6, 2010, the disclosures of which are hereby incorporated by reference in their entirety.

FIELD OF THE INVENTION

Embodiments disclosed herein relate to power cells for electrical devices. More specifically, embodiments relate to inductive charging systems for power packs of mobile devices.

BACKGROUND

Power packs are often used to power mobile devices, such as cellular telephones, personal digital assistants (PDAs), media players and the like. Typically, power packs include rechargeable electrochemical cells or batteries, which are charged using a dedicated charger unit drawing power from some power source such as the mains or a vehicle battery and which may be external or internal to the device.

Charger units powered from mains or power lines usually consist of a bulky plug box, containing a step-down transformer and a rectifier, with conducting pins for connecting to the mains socket. When in use, the plug box is plugged into a mains socket and a trailing cord connects to the device via a connecting plug. If the trailing wire is snagged or jerked the wire and connectors may be damaged or the device may be pulled to the ground. Moreover, the trailing wire itself is inconvenient and unsightly particularly where a number of devices are charged from a common power socket and the trailing wires may become entangled.

Systems are known involving various add-on inductive power receivers which are retrofittable to portable electrical devices. Such receivers which may be retrofitted to the power packs of electrical devices. Note that, in such systems, the inductive unit is an external unit which connects to the power pack via its conductive contacts.

A prior art system is described in PCT/KR2007/004418 to Jung, titled "Non-contact charger system of wireless power transmission for battery and control method thereof". Jung's patent application describes a wireless charger system for a battery pack which may include a receiving unit incorporated into the housing of the battery pack. In Jung's receiver a number of separate electronic blocks are described including a secondary core block, a secondary rectification block, a battery charging block, a charge monitoring block and a battery protection block each of which controls a different aspect of the charging process. Because all the separate circuit blocks are incorporated into the battery pack housing, they must share available space with the electrochemical cells. Consequently, the size of the battery and its capacity may be compromised in order to provide space for the control circuitry for inductive charging.

There is, therefore, a need for an inductive receiving unit for integration into the housing of a battery pack with minimal circuit blocks and overall smaller dimensions. Embodiments described herein address this need.

SUMMARY OF THE EMBODIMENTS

Power packs are smart and well protected electronics systems characterized by very high reliability. They are very sensitive to heat and overcurrent and overvoltage conditions. Care is needed when charging of the power packs following a charging protocol, which is typically defined by the chemistry of the rechargeable electrochemical cell. Sophisticated electronic circuitry is often provided to control the power transfer, generate DC current/voltage, monitor and protect the battery pack, communicate with the mobile communication device.

Embodiments described herein provide a simplified, smart, low cost and low profile electronic system for inductive charging of the power pack as well as an inductively enabled power pack. According to various embodiments, the system may incorporate all the above principals and may be implemented using a number of Integrated Circuits (IC) or one Application Specific Integrated Circuit (ASIC).

Accordingly, various embodiments are directed towards providing a charging system for providing power to a power pack, the system comprising: at least one application-specific integrated circuit for controlling transfer of power to the power pack and managing communication with an external power source. Typically, the external power source comprises an inductive power supply, the power pack further comprising a secondary inductor for inductively coupling with a primary inductor of the inductive power supply. Optionally the system includes at least one electrochemical cell for storing energy received from the external power supply and at least one magnetic shield for guiding magnetic flux away from the electrochemical cell. The system may include a rectification unit for providing rectified direct current power from an alternating current supply.

Optionally, the charging system further comprises a secondary inductor for inductively coupling with an external primary inductor. The charging system is typically incorporated into the power pack. Optionally, the power pack comprises at least one electrochemical cell. Possibly, the power pack comprises at least one of a lithium-polymer battery pack or a lithium ion polymer battery pack. Variously, the power pack is provided for powering a portable electronic device, for example selected from the group comprising: telephones, media players, games consoles, PDAs and remote control units etc.

The system may further comprise a temperature sensor for measuring battery temperature. The temperature sensor comprises at least one element selected from a group consisting of thermistors, thermocouples, digital sensors, current sensors and combinations thereof. Optionally, the system is configured to charge the power pack when the monitored battery temperature is within the range 263 Kelvin to 333 Kelvin.

Typically, the application-specific integrated circuit is operable to monitor at least one parameter selected from a group consisting of: charging current, discharge current, actual battery charge, battery voltage temperature of the power pack and battery temperature. Optionally, application-specific integrated circuit further comprises a protection circuit for disconnecting the charging current in response to at least one of the conditions selected from a group consisting of: excessive charge current, low charge current, excessive temperature, absence of load, absence of external charger, battery is charging and a fully charged power pack.

In selected embodiments, the application-specific integrated circuit further comprises at least one electronic switch for disconnecting the charging current. Typically, the application-specific integrated circuit further comprises at least one electronic switch for disconnecting the charging current when the charging current is higher than an upper threshold value. For example in some embodiments the upper threshold value may be above 1.1 A. Optionally, the application-specific integrated circuit further comprises at least one electronic switch for disconnecting the charging current when the charging current is below a lower threshold value. Typically the electronic switch comprises a power MOSFET.

In certain embodiments, the system further comprises at least one fault indicator. Optionally, the system further comprises at least one LED for indicating at least one condition selected from a group consisting of: excessive charge current, low charge current, excessive temperature, absence of load, absence of external charger, battery is charging and a fully charged power pack.

Optionally, the system may further comprise at least one data contact configured to connect with a host device thereby providing a communication channel between the power pack and the host device. The data contact may be connected via at least one electronic switch to an electronic element having variable resistor. Where required, the system may further comprise an electronic switch connected between an anode contact and a cathode contact of said power pack.

Other embodiments are directed to teaching a method for providing power to a power pack, comprising the steps: providing at least one application-specific integrated circuit, controlling transfer of power to the power pack and managing communication with an external power source.

BRIEF DESCRIPTION OF THE FIGURES

For a better understanding of the embodiments and to show how they may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects of the embodiments. In this regard, no attempt is made to show structural details in more detail than is necessary for a fundamental understanding; the description taken with the drawings making apparent to those skilled in the art how the several forms may be embodied in practice. In the accompanying drawings.

DESCRIPTION OF SELECTED EMBODIMENTS

Figure 1:
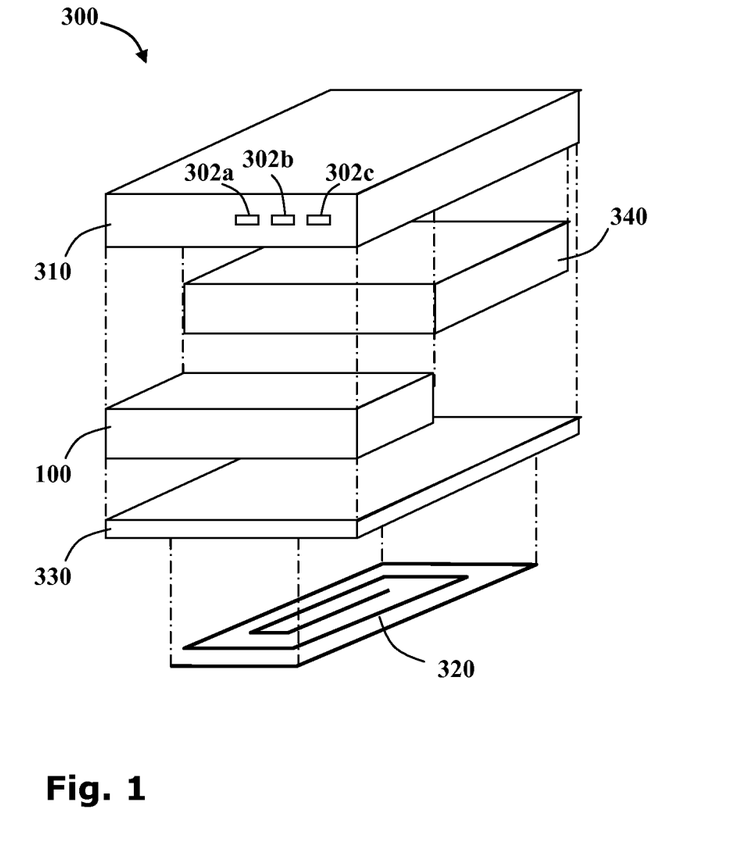
FIG. 1 is a schematic representation of an embodiment of an induction enabled power pack.

Reference is now made to FIG. 1 which shows a schematic representation of an embodiment of an induction enabled power pack 300. The power pack 300 includes a casing 310 containing a secondary inductor 320, a magnetic flux guide 330, an electrochemical cell 340 and an interface module 100. Typically, the power pack 300 is configured to connect to an electrical device 400 (FIG. 2a) via multiple electrical contacts 302a, 302b, 302c.

According to various embodiments, the dimensions of the casing 310, and characteristics of the electrochemical cell 340 are selected to suit a variety of electrical devices such as a telephone, a media player, a games console, a personal digital assistant (PDA) or the like. Embodiments of the power pack may thereby provide inductive charging functionality to existing electrical devices with no modification of the electrical device itself.

Because the lifetime of an electrochemical cell may be shorter than the lifetime of the electrical device to which it provides power, electrical devices are typically designed such that their power packs are easily replaceable. The power pack disclosed herein makes use of this replaceablity by providing a battery, such as a lithium-ion electrochemical cell for example, configured to supply power at the voltage required to power the associated electrical device. Where the dimensions of the casing 310 match the electrical device, the inductive power pack 300 may be readily retrofitted onto the electrical device to provide inductive functionality. It is noted that so as to allow inclusion of other components into the casing 310, an electrochemical cell 340 with small dimensions may be selected. Suitable electrochemical cells capable of providing energy efficiently include, for example, lithium-thionyl chloride cells or its variants such as the high energy density $Li/SOCl_2$ Cells, $Li/SO_2$ Cells, $Li/MnO_2$ Cells, Lithium Polymer Cells. Special Cells, Mobile Phone Cells, Charger Li-ion Cells, NiMH Cells, NiCd Cells or the like.

Figure 2A:
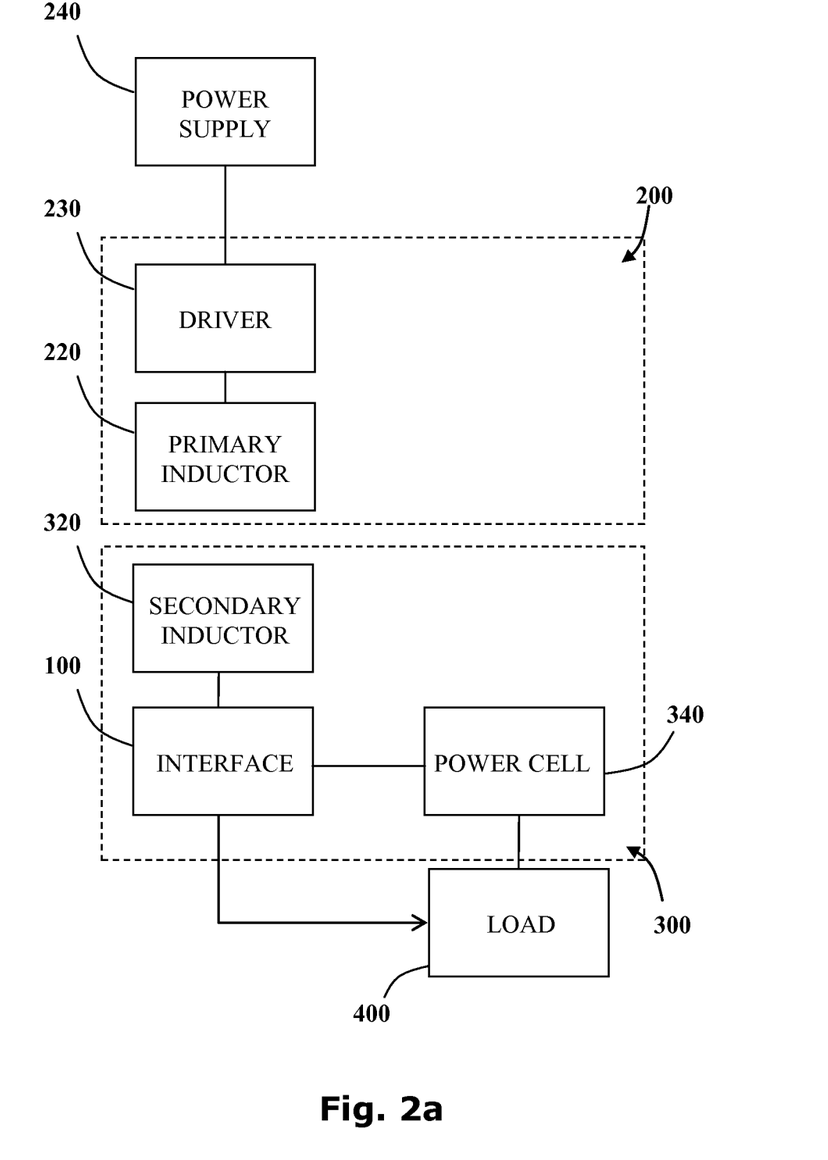
FIG. 2a is a block diagram representing the main components of another embodiment of an inductive charging system including an induction enabled power pack.

The secondary inductor 320 of the inductive power pack 300 is typically an induction coil configured to inductively couple with a primary inductor 220 (FIG. 2a). The magnetic flux guide 330 is provided to direct magnetic flux from the primary inductor 220 to the secondary inductor 320 and to reduce flux leakage to the surroundings.

A thin magnetic flux guide 330 may be constructed from amorphous ferromagnetic material for example, which may be a few microns thick. Such a magnetic flux guide 330 may be provided to shield the electrochemical cell 340 as well as the electrical device from undesirable eddy currents within their conductive components. Certain embodiments may use ferromagnetic flux guiding material with a thickness of about 20 microns or so, which, when laminated by a polymer laminate on both sides may have an overall thickness of around 60 microns, for example. Various methods for fabricating magnetic guiding elements from amorphous ferromagnetic material include, inter alia: printing, stamping, cutting, amorphous ferromagnetic microwire cloth and the like.

Reference is now made to FIG. 2a which shows a block diagram representing the main components of a possible inductive charging system including an inductive power outlet 200 and an inductive charging enabled power pack 300.

The inductive power outlet 200 includes a primary inductor 220 which is wired, via a driving unit 230, to a power supply 240, such as the mains or a vehicle battery for example. The driving unit 230 is configured to provide an oscillating driving voltage to the primary inductor 220. As will be described below, in certain embodiments, the oscillating driving voltage is selected to be at a frequency other than the resonant frequency of the inductive coupling system.

The power pack 300 is configured to power an electrical load 400 and incorporates the secondary inductor 320, the electrochemical cell 340 and the interface module 100. In certain embodiments, the secondary inductor 320 and the interface module 100 may be additionally operable to power the electric load 400 directly without charging the electrochemical cell.

It is a particular feature of embodiments of the interface module 100 that it may be operable to charge the power pack 300 or control the transfer of power to the load 400 and to manage communication between the power pack 300 and the inductive power outlet 200. Accordingly, in various embodiments the interface module 100 is configured to perform a variety of functions including, but not limited by, the following:

- rectification of alternating current (AC) generated by the secondary inductor 320 into direct current (DC) for charging the electrochemical cell 340,
- regulating the charging voltage across the electrochemical cell 340,
- regulating the charging current to the electrochemical cell 340,
- regulating the temperature of the electrochemical cell 340 for example by controlling the charging current
- sending feedback signals to the primary inductor,
- controlling the energy transfer from inductive power system 200,
- identifying the power pack 300 for the inductive power system,
- indicating that the power pack 300 is fully charged, possibly via an charge indication light,
- automatically terminating the charging process,
- automatically disconnecting the electrochemical cell 340 from the electric load 400,
- monitoring charge status,
- monitoring voltage across the power pack,
- detecting faults,
- prevention of deep discharge of the electromechanical cell, and
- synchronization/communication with the battery pack electronics.

It is noted that over-charging may be damaging for many electrochemical cells. Therefore charging of the electrochemical cell 340 may be automatically terminated when the target voltage has been reached or the charging current has dropped below a predetermined level. Additionally, to prevent over-discharge, a circuit breaker may be provided to disconnect the electrochemical cell from the load 400 when a lower limit is reached.

Because excessive current can damage the cell 340 and may be indicative of a short circuit or other fault, the interface circuit 100 may be configured to monitor charge or discharge current. Alongside the current monitor, the interface circuit 100 may further include a current limiter for reducing or cutting-off large currents in excess of the rated charge current, for example currents above 1.2 ampere or so, which may be damaging to the battery. Current monitoring and limiting functionality may be provided by means of a current sense resistor. It is further noted that, in embodiments in which a protection circuit disconnects the electrochemical cell when fully charged, the interface module may be further configured to ensure that the electrochemical cell is fully charged by periodically reactivating the charge current. Accordingly in some embodiments, once the charging current is cut off, the interface circuit 100 is configured to send a signal to deactivate a primary inductor 220 coupled to the secondary inductor 320 of the power pack 300. Where required, a periodic refresh charging procedure may be activated after set intervals of, say, two hours or so.

It is noted that the charging process may be temperature dependent. High charging temperatures may damage the electrochemical cell and low temperatures may result in limited charging. Because of this temperature dependency, the interface circuit 100 may be further configured to monitor and regulate the power pack temperature during the charging. Optionally, a temperature sensor, such as a thermistor, thermocouple, digital sensors or the like, may be provided to monitor charging temperature and logic applied to limit charging current in order to keep the temperature within a preferred range. Notably, particular embodiments may be configured to operate within the internal temperature range from say minus ten degrees Celsius to forty-five degrees Celsius (263 Kelvin to 328 Kelvin).

Historical data pertaining to the usage of the electrochemical cell may be monitored and recorded using a gas gauge for example. Charging data may be used to determine the desired charging parameters for the power pack. It is a particular feature of embodiments in which the inductive charging circuit is integral to the power pack that cumulative charging data specific to the particular power pack may be stored so as to further enhance the efficiency of the charging process.

Figure 2B:
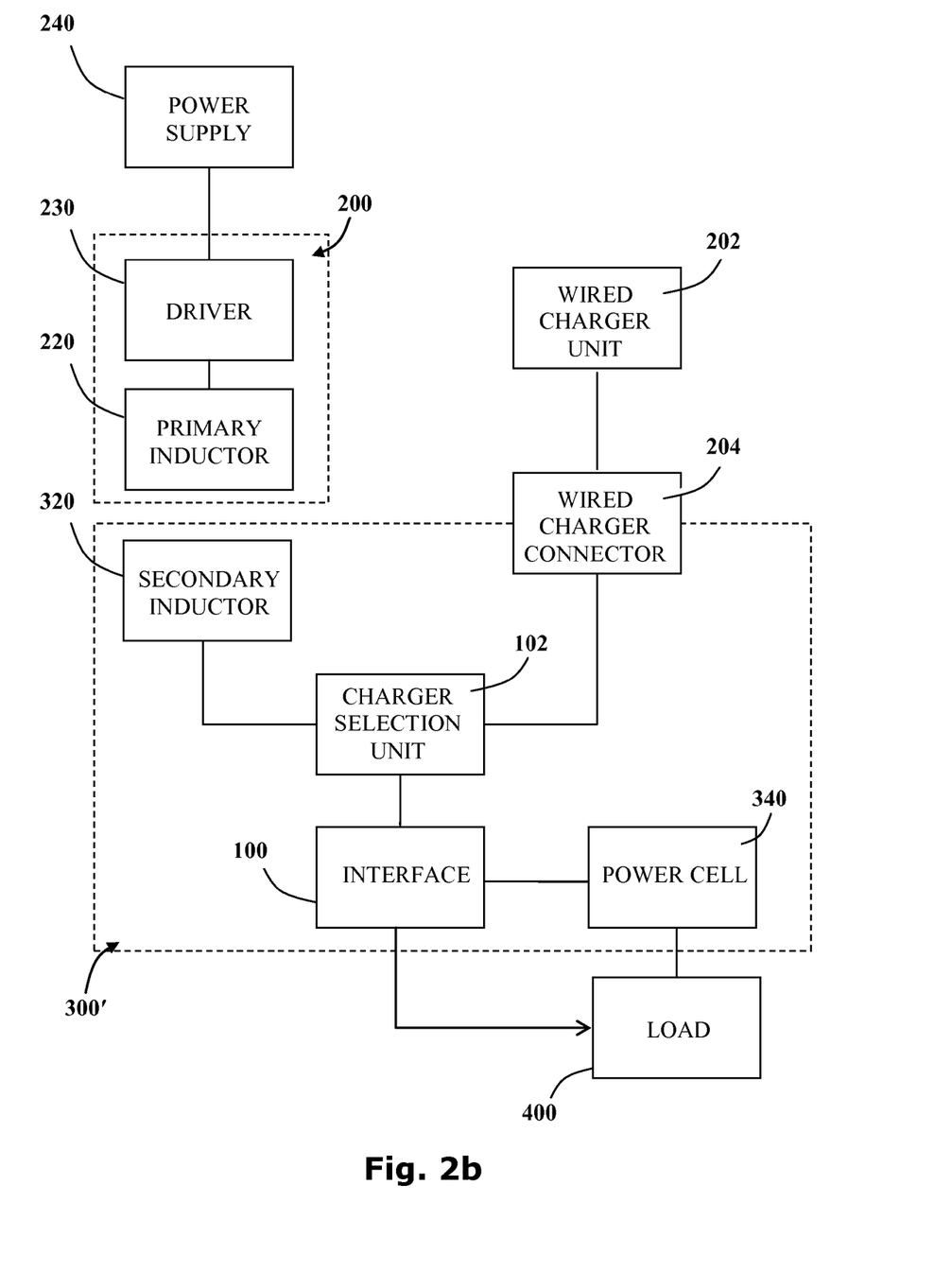
FIG. 2b is a block diagram representing the main components of a dual-mode inductive and wired inductive charging system.

In single-mode embodiments, such as described hereinabove with reference to FIG. 2a, the inductive enabled power pack 300 is configured only to receive power inductively. Referring now to FIG. 2b, an alternative embodiment is represented of a dual-mode inductive power pack 300' which is further configured to receive power from a wired charger unit 202 where required. It will be appreciated that the dual-mode inductive power pack 300' may be useful in combination with electrical devices which have dedicated powering adaptors.

The dual-mode inductive power pack 300' includes a charger selection unit 102. The charger selection unit 102 is configured to switch between wired and inductive charging modes. Optionally, the charger selection unit 102 may be configured to disconnect one charger type in the presence of the other. For example when a wired charger 202 is connected, the charger selection unit 102 may be configured to disconnect the secondary inductor 320 in order to prevent double charging. In other embodiments the charger selection unit 102 may be configured to disconnect the wired charger connector 204 when an inductive charger 200 is coupled to the inductive power pack 300'. Alternatively, in still other embodiments, the charger selection unit 102 may be configured to control simultaneous charging using a combination of inductive and wired charging modes.

Figure 3A:
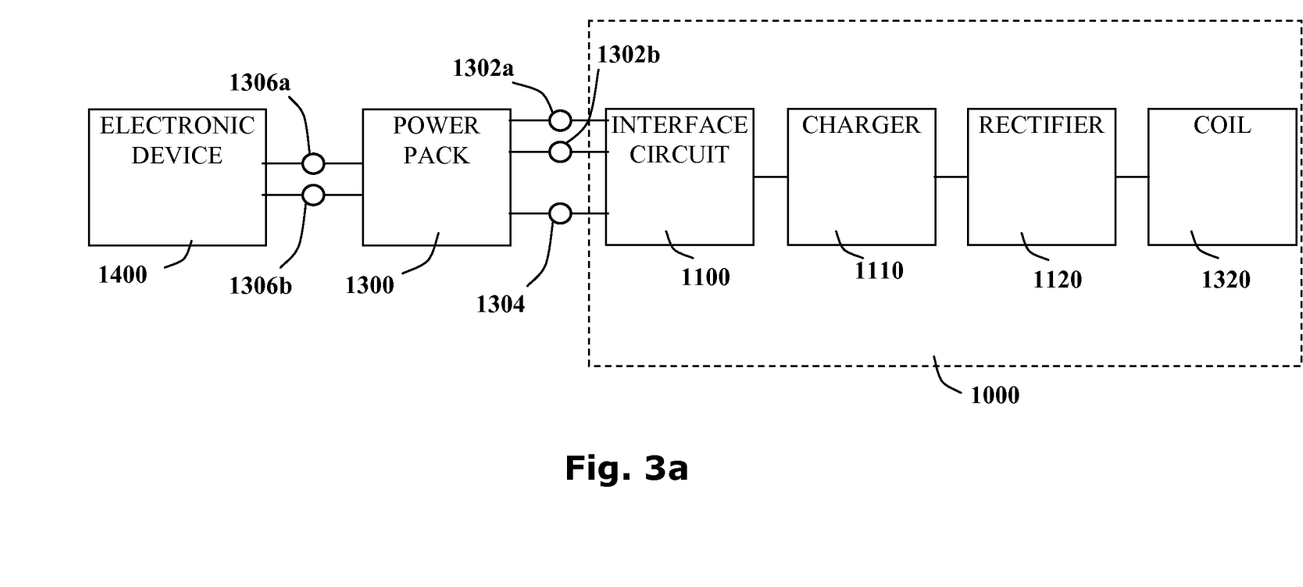
FIG. 3a is a block diagram schematically representing a power pack connected to an induction enabling unit according to another embodiment.

Referring now to FIG. 3a, a block diagram is shown schematically representing a power pack 1300 of an electronic device 1400 connected to an induction enabling unit 1000. The induction enabling unit 1000 includes a secondary inductor 1320, an interface circuit 1100, a battery charging unit 1110 and a rectification unit 1120. The interface unit 1000 is configured to conductively couple with the battery pack 1300 via at least two power transfer contacts 1302a, 1302b, and at least one data transfer contact 1304.

It is noted that the induction enabling unit 1000 may be provided to enable standard power packs 1300 to receive power inductively. The induction enabling unit 1000 may have dimensions suitable for inclusion within or integration with the power pack casing of the electrical device 1400 such as a mobile telephone for example.

In selected embodiments, the data transfer contacts 1304 may be configured to provide a communication channel between the power pack 1300 and the electrical device 1400. The communication channel may be used to transfer data signals encoding information pertaining to the power pack, for example the charge level, temperature during charging and so on. Accordingly a first data transfer contact 1304 may be connected to a thermistor for measurement of cell temperature. Where appropriate, a second data transfer contact 1304 may be connected to an electronic element such as a resistor provided to signal to the electrical device the identity of the power pack 1300.

It is a particular feature of selected inductively enabled power packs that the second data transfer 1304 is connected to an identification resistor via an electronic switch, such as a MOSFET or the like, configured to provide a variable resistance. It is noted that the variable resistance of the identification element may be adjusted to indicate that the cell is being inductively charged. The electrical device may then be configured to indicate that charging is in progress via some output display for example.

Furthermore, an electronic switch such as a MOSFET or the like may be provided between the power transfer contacts configured to connect the anode contact and cathode contact of the power pack thereby forming a short circuit between the contacts. Such a system may be provided to simulate the power pack being removed from the device and reconnected. This is particularly useful for devices configured to shut down when the power level of the power pack falls below a minimum level. Such a device may not detect that the power cell has been inductively recharged and may be prevented from restarting. The electronic switch may be used to simulate removal and replacement of the power pack thus prompting the device to restart.

Figure 3B:
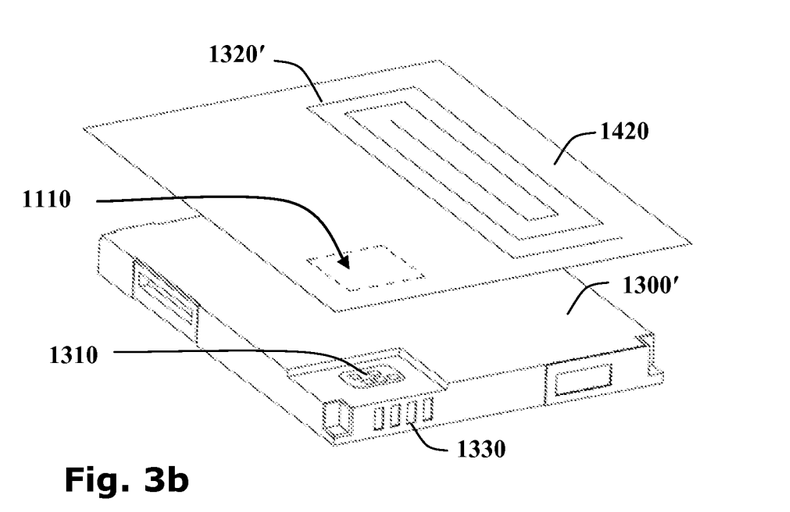
FIGS. 3b and 3c respectively show schematic representations of a particular embodiment of an inductively enabled power pack.
Figure 3C:
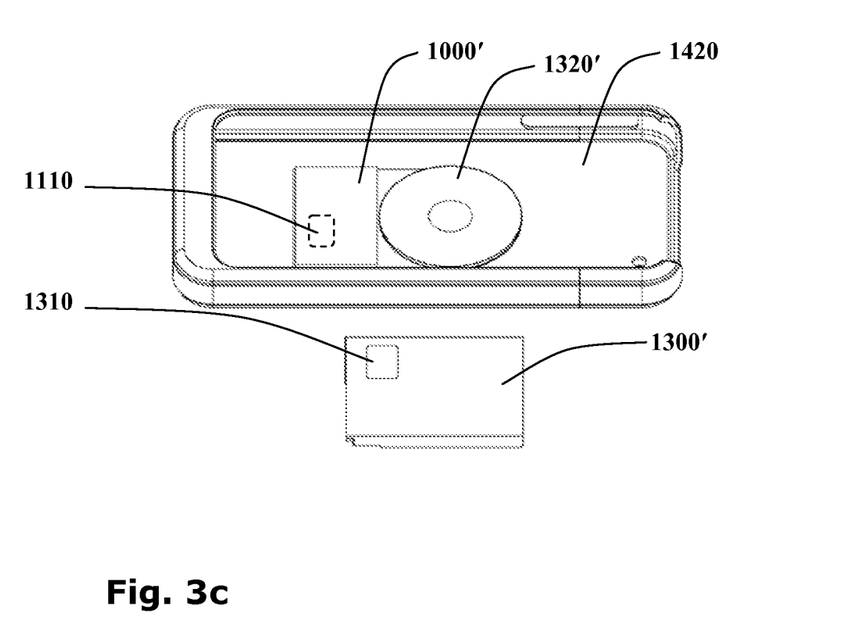

With reference to FIGS. 3b and 3c respectively schematic representations are shown of a particular embodiment of the inductively enabled power pack 1300'. According to the particular embodiment, the power pack 1300' includes a set of power output contacts 1330 and an auxiliary set of contacts 1310.

The power output contacts 1330 are configured to connect to electrical terminals (not shown) in the electrical device being powered by the power pack so as to provide a conductive power line from the electrochemical cell (not shown) to an electrical load (not shown). The auxiliary set of contacts 1310 are configured to provide a conductive connection to a corresponding set of contacts 1110 provided in an inductive enabling unit 1000' mounted to a back cover 1420 for an electrical device such as a mobile telephone or the like.

It is a particular feature that the power pack 1300' may be configured to receive power from an inductive coil 1320' associated with the inductive enabling unit 1000' via the auxiliary set of contacts. It will be appreciated that the auxiliary set of contacts 1310 may further include data exchange terminals and the like as suit requirements.

Figure 4A:
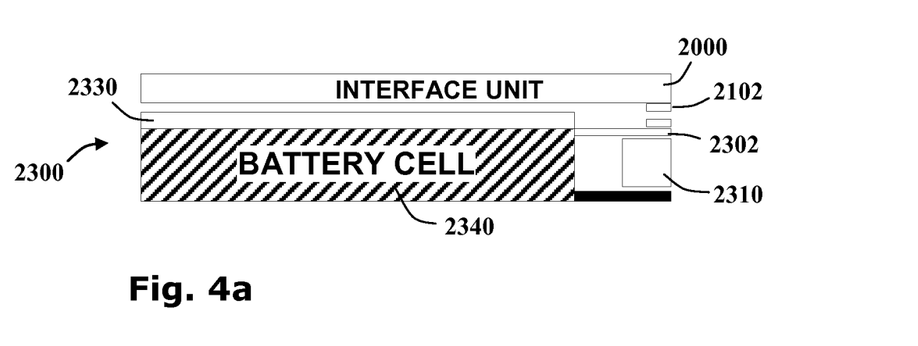
FIGS. 4a and 4b are schematic diagrams showing two possible configurations of inductively enabled power packs according to further embodiments.
Figure 4B:
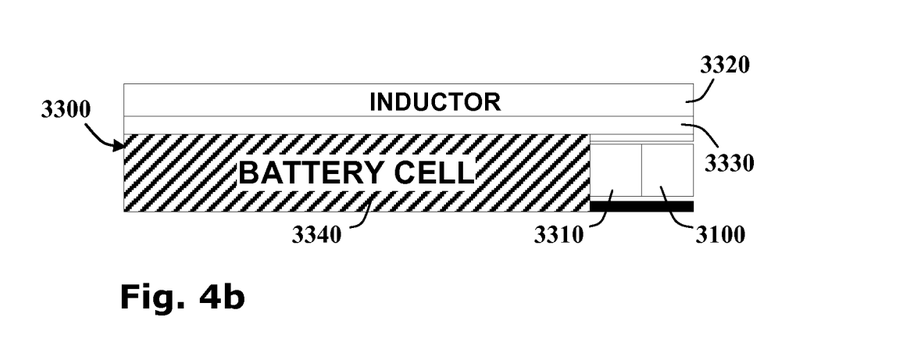

FIGS. 4a and 4b are schematic cross sections representing two possible configurations of inductively enabled power packs 2300, 3300. With specific reference to FIG. 4a, a magnetically shielded power pack 2300, is inductively enabled using an induction enabling unit 2000 connected to the power pack 2300 via conducting contacts 2102, 2302. The power pack unit 2300 includes a battery cell 2340 and a protection circuit 2310 for protecting the cell from overcharging, overdischarging, overheating and the like. The induction enabling unit 2000 provides an external unit including a secondary inductor as well as the control electronics for rectification, regulation and the like provided by an interface circuit. The battery cell 2340 is shielded from potentially damaging magnetic fields by a sheet of magnetic shielding material 2330.

An alternative configuration is shown in FIG. 4b in which an all-in-one induction enabled power pack 3300 incorporates the secondary inductor 3320, the magnetic shielding material 3330, the battery cell 3340, as well as the protection circuit 3310 and an interface module 3100 for control electronics for rectification, regulation and the like provided by an interface circuit. It is further noted that a thermally conducting element may be provided as a heat sink for heat removal. Indeed, according to certain embodiments, a thermally conducting magnetic shielding material 3330 may itself and perform both functions.

Figure 5:
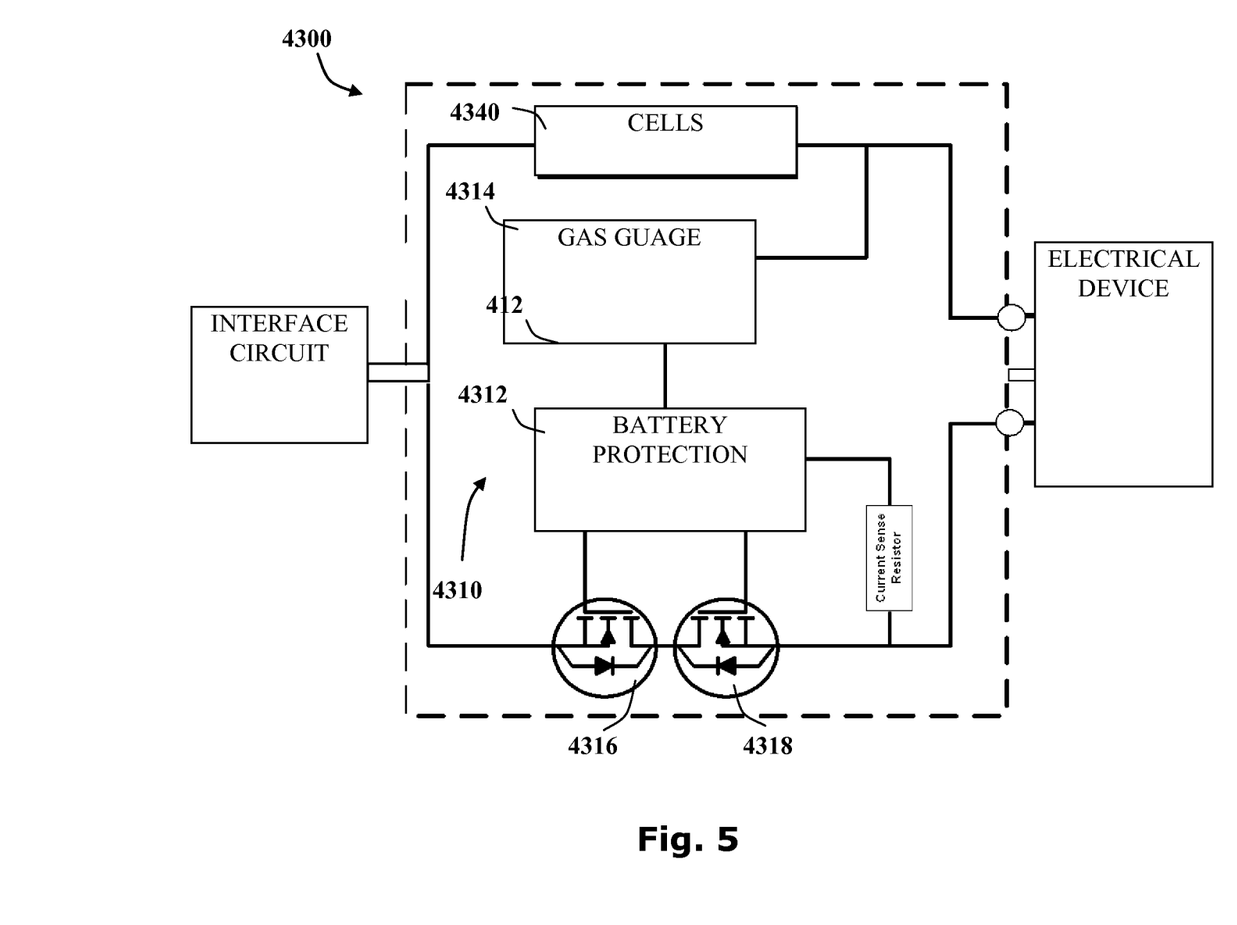
FIG. 5 is a further block diagram of an inductively enabled power pack showing the main components of a possible protection circuit for use with other embodiments of the system.

With reference now to FIG. 5, a further block diagram of an inductively enabled power pack 4300 shows the main components of a possible protection circuit 4310 for use with the system. The protection circuit 4310 includes a battery protection integrated circuit 4312, a gas gauge integrated circuit 4314, a pair of current protecting electronic switches 4316, 4318. Typically, the electronic switches are Metal Oxide Semiconductor Field Effect Transistors (MOSFETs). It is noted that the protection circuit typically includes a series switch which breaks the circuit thereby disconnecting the electrochemical cell, when the protection circuit has been activated such that charging or discharging is not possible until the circuit has been reset.

Where required, indicators may be provided for indicating such states as excessive charge current, low charge current, excessive temperature, absence of load, battery charging, fully charged power pack, fault conditions and the like.

Referring again to FIG. 1, it is a particular feature of that the power pack that the interface module 100 may be an integrated circuit configured to perform a plurality of control functions. Some of this functionality may be provided by the interface module 100 interacting with external circuits, for example the protection circuit of a standard power pack.

It is noted that, in order to avoid compromising the size of the electrochemical cell 340, when an inductive power receiver is incorporated within the casing 310 of a power pack 300, the dimensions of the interface module 100 should be minimized. Therefore, according to selected embodiments, the interface module 100 is an Application-Specific Integrated Circuit (ASIC). ASICs may be preferred to other integrated circuits as they generally have very small dimensions. In particular embodiments, all the components of the interface module 100 can be assembled into one Multi Chip Module (MCM) or implemented in a Monolithic IC.

In addition, various features of the system may be directed towards allowing the control components to have smaller size. A known limitation upon the size of electrical components is the rate at which they can dissipate heat. Smaller components do not dissipate heat as well as larger components. Selected embodiments of the system reduce the heat generated by the control components so that they may be of smaller dimensions.

A first heat reduction feature enabling small control components is described in copending U.S. patent application Ser. No. 12/497,088 which is incorporated herein by reference. The frequency of the oscillating driving voltage of the primary inductor 220 may be significantly different from the resonant frequency of the inductive coupling system. Non-resonant transmission uses lower transmission voltages than resonant transmission, consequently less heat may be generated by control components and they may therefore have smaller dimensions. It is further noted that, when using non-resonant inductive power transmission, a feedback signal for regulating power transfer may be passed from the inductive receiver to the inductive transmitter via an inductive communication channel.

An inductive communication channel may include a transmission circuit associated with the inductive power receiver and a receiving circuit associated with an inductive power transmitter. The transmission circuit is wired to the secondary coil and the receiving circuit is wired to the primary coil.

The signal transmission circuit includes at least one electrical element, selected such that when it is connected to the secondary coil, the resonant frequency of the system increases. The transmission circuit is typically configured to selectively connect the electrical element to the secondary coil. Any decrease in either the inductance or the capacitance increases the resonant frequency of the system which may be detected by the signal receiving circuit.

Typically, the signal receiving circuit includes a voltage peak detector configured to detect large increases in the transmission voltage. In systems where the voltage transmission frequency is higher than the resonant frequency of the system, such large increases in transmission voltage may be caused by an increase in the resonant frequency thereby indicating that the electrical element has been connected to the secondary coil. Thus the transmission circuit may be used to send a signal pulse to the receiving circuit and a coded signal may be constructed from such pulses. The transmission circuit may also include a modulator for modulating a bit-rate signal with the input signal. The electrical element may then be connected to the secondary inductive coil according to the modulated signal. The receiving circuit may include a demodulator for demodulating the modulated signal. For example the voltage peak detector may be connected to a correlator for cross-correlating the amplitude of the primary voltage with the bit-rate signal thereby producing the output signal.

It is noted that the use of such an inductive communication channel avoids the necessity for large transceivers such as are necessary with other wireless signal transfer such as using known radio wave based protocols.

A second heat reduction feature enabling small control components, which is used in other embodiments of the power pack, is that a low heat loss rectifier 330 is used to convert AC power from the secondary inductor 320 to DC power to charge the electrochemical cell 340. Rather than using a bridge rectifier, in which four diodes are arranged in a Graetz circuit, a bridge synchronous rectifier may be used, such as that described in co-pending U.S. patent application Ser. No. 12/423,530, which is incorporated herein by reference. In the synchrorectifier, at least one of the four diodes of a typical Graetz circuit is replaced by a current-triggered electronic switch. For example a Power MOSFET may be configured to receive a gate signal from a current monitor wired to its own drain terminal. The current monitor may be configured to send a gate signal to the MOSFET when the drain-current exceeds a predetermined threshold.

Because the MOSFETs of the synchorectifier described above produce less heat than diodes, heat dissipation becomes easier even for high power or high frequency power transmission. Consequently, a rectifier with a smaller footprint may be included in the interface circuit 100 allowing it to be more easily contained within the casing 310 of the power pack 300.

Thus embodiments disclosed herein provide a low profile electronic system for inductive charging of the power pack of an electrical device as well as an inductively enabled power pack. The system may use a number of innovative features for reducing dimensions such as the use of application specific integrated circuits (ASIC) and various heat reduction features.

The scope of the disclosed embodiments may be defined by the appended claims and includes both combinations and sub combinations of the various features described hereinabove as well as variations and modifications thereof, which would occur to persons skilled in the art upon reading the foregoing description.

In the claims, the word "comprise", and variations thereof such as "comprises", "comprising" and the like indicate that the components listed are included, but not generally to the exclusion of other components.

The invention claimed is:

1. A charging system for providing power to a power pack, the system comprising:
   at least one secondary inductor configured to couple inductively with a primary inductor;
   at least one application-specific integrated circuit operable to control transfer of power to the power pack; and
   a charger selection unit operable to prevent double charging, said charger selection unit operable between wired and inductive charging modes,
   wherein said system further comprises;
   at least one data contact connected via at least one electronic switch to an electronic element, said electronic element configured to indicate that the power pack is being inductively charged; and
   at least one current limiter for reducing large currents.

2. The system of claim 1 wherein said application-specific integrated circuit is further configured to manage communication with the inductive power outlet.

3. The system of claim 1 further comprising a rectification unit for providing rectified direct current power from an alternating current supply.

4. The system of claim 3 further comprising at least one magnetic shield for guiding magnetic flux away from an electrochemical cell.

5. The system of claim 1 incorporated into the power pack.

6. The system of claim 1 further comprising a temperature sensor for measuring battery temperature.

7. The system of claim 1 configured to charge the power pack at a monitored battery temperature within the range 263 Kelvin to 333 Kelvin.

8. The system of claim 1 wherein the application-specific integrated circuit is operable to monitor at least one parameter selected from a group consisting of: charging current, discharge current, actual battery charge, battery voltage, temperature of the power pack and battery temperature.

9. The system of claim 1 wherein the application-specific integrated circuit further comprises a protection circuit for disconnecting the charging current in response to at least one of the conditions selected from a group consisting of: excessive charge current, low charge current, excessive temperature, absence of load, absence of external charger, battery is charging and a fully charged power pack.

10. The system of claim 1 wherein the application-specific integrated circuit further comprises at least one electronic switch for disconnecting the charging current.

11. The system of claim 1 wherein the application-specific integrated circuit further comprises at least one electronic switch for disconnecting the charging current when the charging current is higher than an upper threshold value.

12. The system of claim 11 wherein the upper threshold value is above 1.1 ampere.

13. The system of claim 1 wherein the application-specific integrated circuit further comprises at least one electronic switch for disconnecting the charging current when the charging current is below a lower threshold value.

14. The system of claim 1 further comprising at least one fault indicator.

15. The system of claim 1 further comprising at least one LED for indicating at least one condition selected from a group consisting of: excessive charge current, low charge current, excessive temperature, absence of load, absence of external charger, battery is charging and a fully charged power pack.

16. The system of claim 1 wherein said at least one data contact is configured to connect with a host device thereby providing a communication channel between the power pack and the host device.

17. The system of claim 1 wherein said electronic element has variable resistance.

18. The system of claim 1 further comprising an electronic switch connected between an anode contact and a cathode contact of said power pack.

19. A method for providing power to a power pack, comprising:
   providing at least one secondary inductor;
   providing at least one application-specific integrated circuit;
   providing a charger selection unit operable to prevent double charging;
   providing at least one data contact connected via at least one electronic switch to an electronic element;
   providing at least one current limiter for reducing large currents;
   inductively coupling said secondary inductor to a primary inductor of an inductive power outlet; and
   using said electronic element to indicate that said power pack is being inductively charged.

20. The method of claim 19 further comprising indicating that charging is in progress via an output display.

\* \* \* \* \*